Patented Dec. 6, 1927.

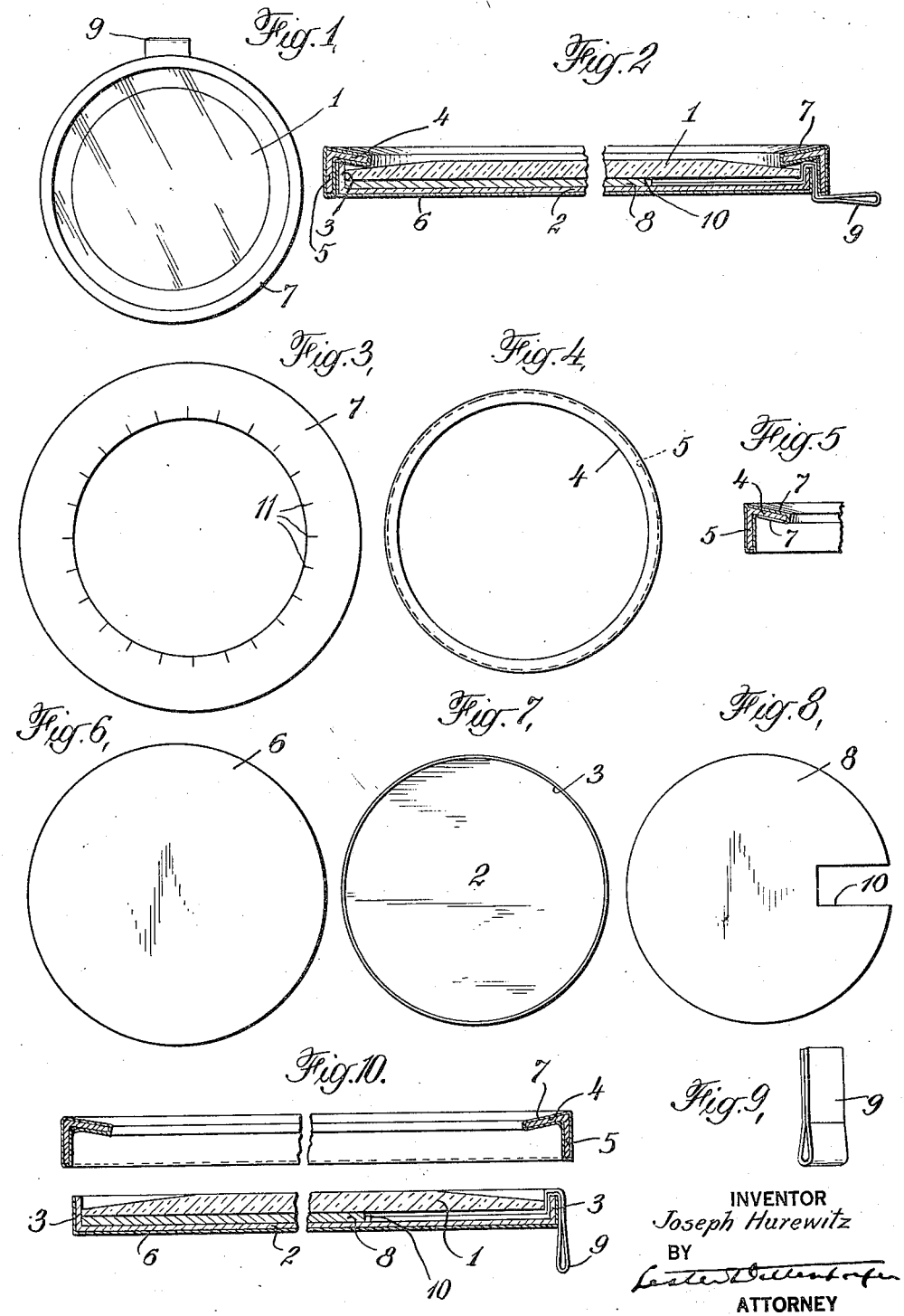

1,651,771

UNITED STATES PATENT OFFICE.

JOSEPH HUREWITZ, OF NEW YORK, N. Y., ASSIGNOR OF ONE-HALF TO HARRY COHN AND BARNET ASHENFARB, COPARTNERS UNDER THE NAME OF AMERICAN MIRROR WORKS, OF NEW YORK, N. Y., AND ONE-HALF TO LENA HUREWITZ, DOING BUSINESS AS ROSE NOVELTY CO., OF NEW YORK, N. Y.

MIRROR.

Application filed July 27, 1926. Serial No. 125,137.

This invention relates to mirrors, and particularly to the kind commonly carried or mounted in ladies' handbags, pocketbooks, vanity cases, and the like.

One of the objects of my invention is to provide a mirror of ornamental appearance having its back and rim protected with a fabric covered casing.

Another object is to produce a mirror which can be assembled without the necessity of gluing or pasting any of the parts.

A further object is to so form the parts of the mirror casing that they can be readily assembled without danger of breaking the mirror.

Other objects, advantages, and features will be apparent from the following detailed description, taken in connection with the accompanying drawings which form part of this specification.

In the drawing, Figure 1 is a front plan view of one form of mirror embodying my invention;

Fig. 2 is a median cross-section thereof, on an enlarged scale;

Fig. 3 is a plan view of the fabric covering for the upper half of the mirror casing;

Fig. 4 is a plan view of the upper half of the casing;

Fig. 5 is a detailed fragmentary view of the upper half of the casing with the fabric covering applied thereto;

Fig. 6 is a plan view of the fabric covering for the lower half of the casing;

Fig. 7 is a plan view of the lower half of the casing;

Fig. 8 is a plan view of the filler;

Fig. 9 is a detailed view of the mirror hanger or loop; and,

Fig. 10 is a sectional view showing the parts in assembling relation.

Referring to the drawings, 1 indicates a mirror, preferably of circular shape having a beveled edge. The mirror is held in a casing consisting of an upper and lower half each of which may be formed of thin sheet metal, cardboard, or other suitable material. The lower half comprises a disk or back 2 preferably having an upstanding flange 3 around its edge, and the upper half comprises an annular portion 4 which surrounds the rim of the mirror and is formed with a downwardly extending flange 5 that fits tightly around the outside of the lower half of the casing.

The upper half of the casing is so constructed that the portion 4 preferably forms an acute angle with the flange 5, as shown in detail in Fig. 5. This construction permits of application of pressure at the corner angle, during assembling of the casing parts, without danger of breaking the mirror.

The lower half of the casing is covered on its outer surface with a fabric covering 6, while the upper half is covered on both its outer and inner surfaces with a fabric covering 7. The filler 8, made of cardboard or other suitable material, may be inserted in the lower half of the casing to provide a cushion for the mirror 1. Also, if desired, a loop or hanger 9 may be provided. In such case the filler 8 is formed with a cutout 10 to receive an end of the loop or hanger, as seen in Fig. 10, so that the filler will lie flat on the inner surface of the back 2 of casing.

The fabric covering 7 of the upper half of the casing is of annular shape with radially extending slits 11 around its inner edge as shown in Fig. 3. These slits permit of wrapping the covering smoothly about the upper half of the casing.

In assembling the parts, the covering 7 is laid on top of the upper half of the casing and wrapped around it so that the outer edge of the covering laps over the lower edge of the flange 5, and the inner edge of the covering laps over the inner edge of the annular portion 4, as seen in Fig. 5.

The mirror 1 is then placed in the lower half of the casing and the fabric covering 6 is wrapped around the outer surface of said casing member so as to conform to the shape thereof. If a filler 8 and hanger 10 are used, these parts will be laid in the lower half of the casing before the mirror is placed therein.

The two parts of the casing are then pressed together so that the flange 5 of the upper half fits tightly around the flange 3 of the lower half. The frictional engagement of the contacting portions of the fabric coverings 6 and 7 serves to firmly bind the two parts of the casing together so that they cannot accidently come apart.

I am aware that prior to my invention it has been proposed to make a pocket mirror having an annular metal rim, and a fabric covering that extends over the back of the mirror and around the metal rim. With such construction, however, the back of the mirror is unprotected, and it is necessary to glue the border of the covering to the back thereof, thereby forming an unsightly ring or demarcation on the back, and increasing the labor cost.

My invention provides a mirror having its edge and back protected with a casing, and having all of the visible parts and edges of the casing completely covered with a fabric covering, which covering has a neat and attractive appearance and is applied to the casing without glue or other adhesive. It is to be understood that I do not limit my invention with respect to the particular shape of the mirror shown, and that various modification in the details herein described may be made without departing from the scope of the invention.

What I claim is:

1. In a mirror, a back member having a marginal flange extending from the periphery of the back member at substantially right angles to the back member throughout the width of the flange, a covering for the back member extending thereover and on the outer face of said flange, a front member having a straight annular portion overhanging and engaging the mirror and having a flange disposed over the flange of the back member and extending parallel thereto and having its free rear edge disposed approximately flush with the bottom face of the back member, a covering for the front member extending over the inner and outer faces of said annular portion and said flange of the front member, the inner free edge of the flange of the back member engaging the part of the covering of the front member which engages the under face of the annular portion of the front member so as to hold the covering taut and engaged throughout with the under face of the annular portion, the parts of the coverings which engage the confronting faces of the two said flanges being in tight frictional engagement so as to mutually secure one another in position.

2. A mirror as per claim 1, wherein there is a backing disposed between the mirror and the back member which backing has a radial slot extending through its periphery and wherein a flexible hanger has one end disposed in the slot and has its other end extending over the flange of the back member and which thence extends outwardly between the two flanges and beyond the flange of the front member.

3. In a mirror, a back member having a marginal flange, a backing for the mirror arranged in said member and having a radial slot extending through the periphery of the backing, a front member having an annular portion overhanging and engaging the mirror and having a flange received over the flange of the back member, and a flexible hanger which has one end disposed in the slot and has its other end extending over the flange of the back member and which thence extends outwardly between the two flanges and beyond the flange of the front member.

4. In a mirror, a back member having a marginal flange extending from the periphery of the back member at substantially right angles to the back member throughout the width of the flange, a covering for the back member extending thereover and on the outer face of said flange, a front member having an annular portion overhanging and engaging the mirror and having a flange disposed over the flange of the back member and extending parallel thereto and having its free rear edge disposed approximately flush with the bottom face of the back member, a covering for the front member extending over the inner and outer faces of said annular portion and said flange of the front member, the inner free edge of the flange of the back member engaging the part of the covering of the front member which engages the under face of the annular portion of the front member so as to hold the covering engaged with the under face of the annular portion, the parts of the coverings which engage the confronting faces of the two said flanges being in tight frictional engagement so as to mutually secure one another in position.

JOSEPH HUREWITZ.